3,117,929
TRANSPARENT DISPERSION LUBRICANTS
Frederic C. McCoy, Beacon, and Herman D. Kluge, Fishkill, N.Y., assignors to Texaco Inc., a corporation of Delaware
No Drawing. Filed Aug. 8, 1958, Ser. No. 753,890
6 Claims. (Cl. 252—33.2)

This invention relates to novel lubricant compositions containing transparent micellar dispersions of water in mineral oil. More particularly, this invention is directed to transparent water-containing lubricant compositions wherein the water is dispersed in the form of micelles having an average particle diameter of less than 0.1 micron.

As disclosed in U.S. 2,744,870, water-in-oil emulsion lubricants wherein the water phase contains a water-soluble divalent metal salt have been used as lubricants for diesel engines operating on a high sulfur hydrocarbon fuel. These emulsion lubricants are said to reduce ring wear and to neutralize the corrosive action of high sulfur fuels. The lubricant compositions of this invention consisting of transparent micellar dispersions of water in mineral oil constitute a substantial advance over emulsion lubricants since they possess superior stability at both high and low temperatures and are readily reformed by stirring even when broken by high temperature or freezing.

The transparent micellar aqueous dispersion lubricants of this invention are effective as hydraulic fluids, as metal working lubricants and as lubricants for internal combustion engines, particularly diesel engines operating on a high sulfur fuel.

The transparent water-containing mineral lubricating compositions of the invention comprise 30–99.0 weight percent oil phase, 1.0–70 percent aqueous phase dispersed throughout the oil phase in the form of micelles having an average diameter of less than 0.1 micron, an oil-soluble amphiphilic dispersant in a concentration equivalent to 5–60 weight percent of the mineral oil component and a water-soluble agent which is a surfactant or hydrotropic salt in a concentration equivalent to 10–50 weight percent of the water phase. The transparent micellar dispersion lubricants also advantageously contain additives which impart other desirable properties such as extreme pressure, added alkalinity, anti-foam and anti-rust properties since these additives can be incorporated without adversely affecting the stability of the transparent dispersions.

In the transparent water-containing lubricant compositions of the invention, water is dispersed throughout the mineral oil phase in micelles having an average diameter less than 0.1 micron and preferably less than 0.05 micron. The water micelles usually have an average diameter between about 0.01 and 0.05 micron. Because the water is dispersed in the form of such small micelles by the action of the proper balance of amphiphilic dispersant and water-soluble agent, the lubricant compositions of the invention are completely transparent and are indistinguishable in appearance from a water-free mineral lubricating oil composition.

Because of their outstanding stability and simple reformability, the transparent water-containing lubricant compositions are superior in applications where emulsions have been used successfully, for example, as safety hydraulic fluids and in lubrication of large slow speed diesel engines.

Since as high as 70 percent water phase can be dispersed in the form of micelles having an average particle diameter less than 0.1 micron by the proper selection and concentration of amphiphilic dispersant and water-soluble surface active agent, lubricant compositions falling within the scope of the invention and containing 40–70 percent water are extremely useful as safety hydraulic fluids. The desired EP properties in the safety hydraulic fluid can be attained by the incorporation of EP agents such as tricresyl phosphate, chlorinated paraffin wax and sulfo-chlorinated olefin polymers into the micellar dispersions.

There has been widespread and increasing use of economy diesel fuels, which term denotes high sulfur content fuels which have undergone a lesser degree of refining than conventional diesel fuels, in marine diesel engines and large stationary diesel engines which employ a separate crankcase lubricant and effect cylinder lubrication by a once-through process, involving continuous introduction of measured quantities of lubricant into the cylinders. These economy diesel fuels are very often mixtures of distillate and residual oils and possess a substantial concentration of vanadium complexes which tend to produce higher corrosive and wear-causing combustion products. The transparent lubricants of the invention wherein the water is dispersed in micelles having an average diameter less than 0.1 micron are outstanding in reducing wear and neutralizing the corrosive action of economy diesel fuels.

The lubricating oil component of the transparent water-containing lubricants of the invention is a mineral lubricating oil or a synthetic lubricating oil of the ester or ether type. Both mineral lubricating oils and the synthetic ether and ester type lubricating oils form transparent micellar dispersions with water when the proper balance of amphiphilic dispersant and water-soluble agent is present.

Mineral lubricating oils are usually employed in the formation of the transparent water-containing lubricants of the invention because of their low cost and availability. The mineral lubricating oils can be paraffin base, naphthene base, mixed paraffin-naphthene base distillate or residual oils. Mineral lubricating oil having SUS viscosities at 100° F. between about 50 and 1500 may be used with mineral oils having SUS viscosities at 100° F. between about 70 and 1250 usually being employed. Distillate fractions are usually employed as the base oil but combinations of distillate fractions with minor amounts, for example, 5–25 volume percent residual oil, are also usable as the base oil. It has been found that naphthene base distillates are advantageously used in the formulation of the transparent lubricants of the invention since they form stable dispersions more readily than paraffin base distillates.

The synthetic lubricating bases are usually of the ester or ether type. High molecular weight, high boiling liquid aliphatic dicarboxylic acid esters possess excellent viscosity-temperature relationships and lubricating properties and are finding ever-increasing utilization in lubricating oils adapted for high and low temperature lubrication; esters of this type are used in the formulation of jet engine oils. Examples of this class of synthetic lubricating bases are the diesters of acids such as sebacic, adipic, azelaic, alkenyl succinic, etc.; specific examples of these diesters are di-2-ethylhexyl sebacate, di-2-ethylhexyl azelate, di-2-ethylhexyl adipate, di-n-amyl sebacate, di-2-ethylhexyl n-dodecyl succinate, di-2-ethoxyethyl sebacate, di-2′-methoxy-2-ethoxyethyl sebacate (the methyl Carbitol diester), di-2′-ethyl-2-n-butoxyethyl sebacate (the 2-ethylbutyl Cellosolve diester), di-2-n-butoxyethyl azelate (the n-butyl Cellosolve diester) and di-2′-n-butoxy-2-ethoxyethyl-n-octyl succinate (the n-butyl Carbitol diester).

Polyester lubricants formed by a reaction of an aliphatic dicarboxylic acid of the type previously described, a glycol and a mono-functional aliphatic monohydroxy alcohol or an aliphatic monocarboxylic acid in specified mol ratios are also employed as the synthetic lubricating base in the compositions of this invention; polyesters of this type are described in U.S. 2,628,974. Polyesters formed by reaction of a mixture containing specified amounts of dipropylene glycol, sebacic acid and 2-ethylhexanol and of a mixture containing adipic acid, diethylene glycol and 2-ethylhexanoic acid illustrate this class of synthetic polyester lubricating bases.

Polyalkylene ethers as illustrated by polyglycols are also used as the lubricating base in the compositions of this invention. Polyethylene glycol, polypropylene glycol, polybutylene glycols and mixed polyethylene-polypropylene glycols are examples of this class of synthetic lubricating bases.

The sulfur analogs of the above-described diesters, polyesters and polyalkylene ethers are also used in the formulation of the lubricating compositions of this invention. Dithioesters are exemplified by di-2-ethylhexyl thiosebacate and di-n-octyl thioadipate; polyethylene thioglycol is an example of the sulfur analogs of the polyalkylene glycols; sulfur analogs of polyesters are exemplified by the reaction product of adipic acid, thioglycol and 2-ethylhexyl mercaptan.

The oil phase, which includes the concentration of amphiphilic dispersant, constitutes 30–99 weight percent of the transparent water-containing lubricants of the invention. The preferred concentration of the oil phase falls between 35 and 90 percent of the total lubricant. In transparent dispersion lubricants used as hydraulic fluids, the oil phase usually comprises 40–70 percent of the micellar dispersion while in diesel engine dispersion lubricants the oil phase usually comprises 65–90 percent by weight of the miscellar dispersion.

The aqueous phase, which includes the concentration of the water-soluble agent, constitutes 1–65 weight percent of the transparent dispersion lubricants. As with the concentration of the oil phase, the intended use of the transparent dispersion is a major factor in determining the water content of the lubricant. The aqueous phase usually comprises 10–65 percent of the transparent dispersion lubricants with 40–70 weight percent aqueous phase normally being used in hydraulic fluids and 10–35 weight percent aqueous phase usually being present in diesel engine lubricants.

The oil-soluble amphiphilic dispersions used in the formulation of the transparent micellar dispersions of the invention are dispersants which are predominantly lipophilic but possess some hydrophilic properties.

The most widely used oil-soluble amphiphilic oil dispersants are alkylene oxide adducts of long chain aliphatic alcohols and alkyl phenols wherein the alkyl group contains 5 or more carbon atoms. These preferred amphiphilic alkylene oxide adducts have the general formula: RO(R′O)$_n$H wherein R is an aliphatic hydrocarbon radical containing 10 or more carbon atoms or an alkaryl hydrocarbon radical in which the alkyl group contains 5 or more carbon atoms, R′ is a divalent $C_2$ or $C_3$ aliphatic hydrocarbon radical and $n$ has a value of 1–6 and preferably 2–5. Examples of preferred amphiphilic agents of this type are a $C_9$ alkyl phenol-ethylene oxide adduct containing 2 mols of ethylene oxide, a $C_{12}$ alkyl phenol-propylene oxide adduct containing an average of 3 propylene oxide units per molecule, a dinonyl phenol-ethylene oxide adduct containing an average of 4 ethylene oxide units per molecule, a $C_{12}$ alkyl phenol-propylene oxide adduct containing an average of 3 propylene oxide units per molecule, a lauryl alcohol-ethylene oxide adduct containing an average of about 3 ethylene oxide units per molecule.

The oil-soluble amphiphilic dispersant can also comprise mixtures of materials such as a mixture of an alkaline earth metal petroleum sulfonate and high molecular weight $C_8$ to $C_{20}$ aliphatic alcohol, a mixture of an alkaline earth metal alkaryl sulfonate and a high molecular weight alcohol, and an alkaline earth metal alkyl phenolate and a high molecular weight alcohol. The following mixtures were found useful as oil-soluble amphiphilic dispersants in the formulation of the transparent micellar dispersions of the invention: a mixture of barium dinonyl naphthalene sulfonate and oleyl alcohol; a mixture of potassium dinonyl naphthalene sulfonate and a lauryl alcohol; a $C_{10}$ plus barium alkyl phenolate plus oleyl alcohol.

The oil-soluble amphiphilic dispersant constitutes 5–60 weight percent of the oil phase of the transparent micellar dispersion lubricants with the preferred concentration of this dispersant falling between 10 and 40 weight percent of the oil base. The concentration of the amphiphilic dispersant is proportional to the concentration of the water content of the transparent dispersion. In products having a high concentration of water, for example, safety hydraulic fluids, it is necessary to use concentrations of amphiphilic dispersant in the upper portion of the recited range, that is, 30–60 weight percent of the oil phase. In products with lower concentrations of water, the concentration of amphiphilic dispersant is reduced proportionately and usually falls in the range of 10–30 weight percent of the oil phase.

The final component required for the formulation of transparent micellar dispersion lubricants is a water-soluble agent which is either a surfactant or a hydrotropic salt. Surfactants which can be a cationic, anionic or non-ionic surfactant, or mixtures of two or more of these surfactants, are defined as materials having a substantial effect on the surface properties of solutions when employed in small quantities. Surfactants distinguish from hydrotropic salts in this connection since hydrotropic salts by definition only affect surface properties when employed in substantial quantities.

Examples of anionic water-soluble surfactants are the alkali metal and ammonium salts of aliphatic fatty acids having 8 or more carbon atoms per molecule, and the alkali metal salts of naphthenic acids and of sulfonic acids.

Examples of cationic water-soluble surfactants are salts of alkylamines and quaternary ammonium salts. Examples of the amine salts are the acetate and propionate of a $C_{14}$ branch chain primary amine and the acetate of lauryl amine. The aliphatic carboxylic acid salts of primary aliphatic amines are preferred cationic water-soluble reactants. Quaternary ammonium salts are exemplified by alkyl benzyl dimethyl ammonium chloride, a widely used bactericide.

Examples of non-ionic water-soluble surfactants are the polyalkylene oxide adducts of aliphatic alcohols and alkyl-substituted phenols. These polyalkylene oxide adducts differ from the oil-soluble amphiphilic dispersants in the fact that they contain a minimum of about 8 alkylene oxide adducts per molecule. These non-ionic water-soluble surfactants have the general formula:

$$RO(R'O)_nH$$

wherein R is an aliphatic hydrocarbon radical containing 8 or more carbon atoms or an alkaryl hydrocarbon radical in which the alkyl group contains 3 or more carbon atoms, R' is a divalent $C_2$ or $C_3$ aliphatic hydrocarbon radical and $n$ has a value of at least 8 and preferably 10–16.

Another class of non-ionic water-soluble surfactants are the alkylene oxide condensation products with compounds containing carboxylic acid groups. Fatty acids, rosin acids and tall oil acids are condensed with alkylene oxides such as ethylene oxides to give products of this type. These compounds have the general formula $$RCOO(R'O)_nH$$

wherein R is an aliphatic hydrocarbon radical containing 5 to 24 carbon atoms, R' is a divalent $C_2$ or $C_3$ aliphatic hydrocarbon radical and $n$ has a value of at least 8.

Hydrotropic salts are defined as compounds which when dissolved in water in substantial concentrations, impart to the resulting solution the property of dissolving normally water-insoluble polar materials. The hydrotropic salts are usually organic in nature although inorganic hydrotropic salts such as sodium carbonate and potassium phosphate may be used in the formulation of the transparent micellar dispersion lubricants of the invention. Hydrotropic salts useful in the lubricants of the invention are the alkali metal and ammonium salts of phenols, of aromatic carboxylic acids and of aryl compounds containing both hydroxy and carboxylic groups substituted on the aryl nucleus. Also useful are the alkali metal and ammonium salts of aliphatic monocarboxylic acids containing less than 8 carbon atoms. Examples of useful hydrotropic salts are potassium benzoate, potassium salicylate, ammonium salicylate, ammonium benzoate, ammonium $C_5$ alkyl benzoate, potassium butyl benzoate, potassium cresylate, sodium $C_4$ alkyl phenolate, and sodium benzoate, potassium isobutyrate, sodium pentanoate and potassium caproate.

The water-soluble agent which is either a surfactant or hydrotropic salt is present in the transparent aqueous dispersion lubricants in a concentration of 10–50 weight percent of the water phase with the preferred concentration falling between 15 and 40 weight percent of the water phase.

The transparent aqueous dispersion lubricants of the invention are prepared by placing the four components, namely, mineral oil, water, amphiphilic dispersant and water-soluble agent, either surfactant or hydrotropic salt, in the prescribed concentrations in a vessel and subjecting the resulting mixture to agitation. The preferred procedure involves dissolving the amphiphilic dispersant in the mineral oil and the water-soluble agent in water, combining the resulting solutions and subjecting the resulting mixture to agitation. In the preparation, excessively high temperatures, that is above about 160° F., and low temperatures, that is, below about 32° F., are avoided since above or below these temperatures there is a tendency for the dispersion to separate into its components. Accordingly, the preparation of the transparent dispersion lubricant is generally effected at temperatures between 60 and 140° F.

Examples 1 to 3 demonstrate the formulation of transparent micellar dispersion lubricants useful as marine diesel cylinder lubricants. The procedure employed for the formulation of both these products was essentially similar and involved adding all the oil-soluble components to a kettle, mixing by air-blowing and then pumping in the aqueous solution of the water-soluble components. A maximum temperature of about 140° F. was observed during the mixing of the components. The composition and properties of these two products are shown in Table I.

*Table I*

| | Composition, weight percent | | |
|---|---|---|---|
| | Example 1 | Example 2 | Example 3 |
| Oil phase: | | | |
| Mineral oil | a 56.0 | b 56.2 | c 58.3 |
| Nonyl phenol-ethylene oxide adduct (average of 2 units per molecule) | 7.85 | 10.52 | 16.3 |
| Nonyl phenol-ethylene oxide adduct (average of 4 units per molecule) | 7.85 | 2.63 | 4.1 |
| Oleic acid | | 0.95 | |
| Oleyl alcohol | | 5.3 | |
| Water phase: | | | |
| Water | 20.6 | 17.8 | 16.4 |
| Potassium caprylate | | | 4.9 |
| Ammonium caprylate | | 3.6 | |
| Ammonium salicylate | | 3.0 | |
| Potassium p-t-butyl phenolate | 6.4 | | |
| KOH | 1.3 | | |
| Silicone anti-foam agent, p.p.m. | 150 | 150 | 150 |
| Properties: | | | |
| Appearance | Transparent | Transparent | Transparent |
| Gravity ° API | 10.9 | 20.2 | 13.4 |
| Vis., SSU at— | | | |
| 100° F. | 1,579 | 649 | 1,282 |
| 210° F. (Ext.) | 79.7 | 68.8 | 90.5 |
| Viscosity Index | 5 | 88 | 75 |
| Pour, ° F. | 10 | 20 | −10 |
| Ash, percent | 3.45 | 0.001 | 1.32 |
| Total Base Number | 27.8 | 21.4 | 16.6 |
| Corrosion, Cu Strip at 212° F. | Pos. Peacock (6) | Neg. (1) | Pos.(5+) |
| ASTM Rusting Test (No H₂O Added) | Pass | Pass | |
| Humidity Cabinet (MIL-L-21260)—Hrs. to failure | 24 (lt. rust) | 408 | 24 (lt. rust) |
| Navy 4-Ball Wear, Microns/Min | 15.8 | 11.7 | 7.9 |
| Storage Stability— | | | |
| After 3 mos. at room temperature | Clear | Clear | Clear |
| After 1 mo. at 150° F. | Clear | Clear | Clear |
| Resistance to Freezing—Appearance after freezing solid and thawing | Clear | Clear | Clear |
| CFR Low Temp. Ring Wear—Improvement over Base Oil, percent | Plus 60 | Minus 267 | | a Naphthene base oil having an SUS Viscosity at 100° F. of 1200.
b SAE Grade 30 paraffin base distillate having an SUS Viscosity at 100° F. of 580.
c SAE Grade 20 refined paraffin base distillate having an SUS viscosity at 100° F. of 335.

The products of Examples 1 and 2 were evaluated as cylinder lubricants for large slow-speed marine and stationary diesel engines with good results.

The formation of transparent micellar dispersions useful as safety hydraulic fluids is shown in Table II. The procedure employed in the formation of these products is essentially the same as that employed in the formation of the diesel lubricants shown in Table I.

*Table II*

| | Composition, Weight Percent | |
|---|---|---|
| | Example 4 | Example 5 |
| Oil Phase: | | |
| Mineral Oil | a 17.7 | b 16.1 |
| Adduct of nonyl phenol and 4 mols of ethylene oxide | 17.6 | 21.5 |
| Tricresyl Phosphate | | 2.2 |
| Water Phase: | | |
| Water | 60.0 | 50.5 |
| Sodium caprylate | 4.7 | |
| Ethanolamine caprylate | | 9.7 |
| Properties: | | |
| Appearance | Clear | Clear |
| Stability at 150° F. (Stoppered bottle) | OK | OK |
| Vis., SSU: | | |
| at 100° F., cs | 519 | 382 |
| at 210° F., cs | 45.5 | 49 |
| Pour Point, ° F. | | 30 |
| Corr. Cu Strip at 212° F. | | Neg. (1) |
| Autogenous Ign. Temp., ° F. | 980 | 845 |
| Neutralization No. | | 30.4 |
| 4-Ball One-Hour Wear Test— | | |
| 1 kg. load, scar diam. mm | | 0.330 |
| 10 kg. load, scar diam. mm | | 0.561 |
| 40 kg. load, scar diam. mm | | 0.960 |
| ASTM Rusting Test—(No H₂O added) | | Pass | a Naphthene base oil having an SUS at 100° F. of 104.6.
b Paraffin base oil having an SUS at 100° F. of 75.

The formulation of transparent lubricants employing synthetic and mineral lubricating oils and mixtures of synthetic and mineral lubricating oils is illustrated in Examples 6 through 8. The procedure employed to prepare these products is exactly the same as that employed in the preparation of the diesel cylinder lubricants in Examples 1 to 3. The composition of these transparent micellar dispersions employing synthetic lubricating oils as a component of the oil phase is shown in Table III.

*Table III*

|  | Composition, Weight Percent | | |
| --- | --- | --- | --- |
|  | Example 6 | Example 7 | Example 8 |
| Oil Phase: | | | |
| Di-2-ethylhexyl sebacate | 55.7 | 27.5 | |
| Polyalkylene oxide synthetic lubricant (mixture of ethylene and propylene oxides—Ucon LB-385) | | | |
| Mineral Oil | | a 27.5 | b 38.5 |
| Tricresyl Phosphate | | | 19.2 |
| Adduct of nonylphenol and 2 mols of ethylene oxide | 20.6 | 19.1 | 18.4 |
| Adduct of nonylphenol and 4 mols of ethylene oxide | 5.2 | 4.75 | 4.6 |
| Mixed fatty alcohols mainly oleyl alcohol | | 2.75 | |
| Water Phase: | | | |
| Water | 13.5 | 13.4 | 13.5 |
| Ammonium caprylate | 2.7 | 2.75 | 5.8 |
| Ammonium salicylate | 2.3 | 2.25 | | a SAE 30 paraffin base mineral oil having an SUS viscosity at 100° F. of 580.
b Naphthene base mineral oil having an SUS viscosity at 100° F. of 1128.

All of the above were clear, transparent micellar dispersions characterized by excellent stability.

The use of cationic and non-ionic water-soluble surfactants are demonstrated in Examples 9 and 10 whose composition is shown in Table IV. The use of anionic water-soluble surfactants and hydrotropic salts in the formulation of transparent micellar dispersions has been shown in previous examples; the use of anionic water-soluble surfactants is shown in Examples 3 and 4 and the use of hydrotropic salts is shown in Examples 1, 2, 6 and 7.

*Table IV*

|  | Composition, Weight Percent | |
| --- | --- | --- |
|  | Example 9 | Example 10 |
| Oil Phase: | | |
| Mineral Oil | a 22.7 | b 66.7 |
| Adduct of nonylphenol and 4 mols of ethylene oxide | 15.2 | 13.3 |
| Water Phase: | | |
| Water | 50.0 | 17.0 |
| Acetate of a t-C$_{15}$ primary amine | 12.1 | |
| Adduct of alkylphenol and 15 mols of ethylene oxide | | 3.0 | a Paraffin base oil having an SUS viscosity at 100° F. of 75.
b Naphthene base oil having an SUS viscosity at 100° F. of 1128.

Both the product in Example 9 prepared with a cationic water-soluble surfactant and the product of Example 10 prepared with a non-ionic water-soluble surfactant were clear, stable transparent dispersions. Both products were useful as hydraulic fluids with the Example 9 product being a safety hydraulic fluid. The incorporation of extreme pressure and alkaline agents in the Example 10 product makes it a useful diesel cylinder lubricant.

Obviously, many modifications and variations of the invention as hereinbefore set forth may be made without departing from the spirit and scope thereof and, therefore, only such limitations should be imposed as are indicated in the appended claims.

We claim:
1. A transparent lubricant composition comprising (a) 30–99 weight percent lubricating oil phase, (b) 1–70 weight percent aqueous phase, said aqueous phase being dispersed in the form of micelles having an average diameter less than 0.1 micron, (c) an oil-soluble dispersant in a concentration equivalent to 10–60 weight percent of said oil phase and being selected from the group consisting of
   (1) alkylene oxide adducts of the general formula RO(R'O)$_n$H wherein R is selected from the group consisting of an aliphatic hydrocarbon radical containing at least 10 carbon atoms and an alkaryl hydrocarbyl radical having an alkyl group containing at least 5 carbon atoms, R' is a divalent C$_2$–C$_3$ aliphatic hydrocarbon radical and $n$ has a value of 1–6 and
   (2) a mixture of a high molecular weight aliphatic alcohol and a detergent selected from the group consisting of alkaline earth metal petroleum sulfonates, alkaline earth metal phenolates and mixtures thereof, and

(d) a water soluble surfactant in a concentration equivalent to 10–50 weight percent of said aqueous phase and selected from the group consisting of
   (1) alkali metal and ammonium salts of sulfonic acids and fatty and naphthenic acids containing at least 8 carbon atoms per molecule,
   (2) quaternary ammonium salts,
   (3) aliphatic carboxylic acid salts of primary aliphatic amines,
   (4) polyalkylene oxide adducts of aliphatic alcohols and alkyl-substituted phenols of the general formula RO(R'O)$_n$H wherein R is selected from the group consisting of an aliphatic hydrocarbyl radical containing at least 8 carbon atoms and an alkaryl hydrocarbyl radical in which the alkyl group contains at least 3 carbon atoms, R' is a divalent C$_2$–C$_3$ aliphatic hydrocarbyl radical and $n$ has a value of at least 8,
   (5) alkylene oxide adducts of carboxylic acids of the general formula RCOO(R'O)$_n$H wherein R is an aliphatic hydrocarbyl radical containing 5–24 carbon atoms, R' is a divalent C$_2$–C$_3$ aliphatic hydrocarbyl radical and $n$ has a value of at least 8,
   (6) hydrotropic inorganic salts, and
   (7) organic hydrotropic salts selected from the group consisting of alkali metal and ammonium salts of phenol, of aromatic carboxylic acids, of hydroxy- and carboxylic-substituted aryl compounds and of aliphatic monocarboxylic acids containing less than 8 carbon atoms.

2. A transparent lubricant composition as described in claim 1 comprising 35–90 weight percent lubricating oil phase and 10–65 weight percent aqueous phase.

3. A transparent lubricant composition as described in claim 1 in which said oil-soluble dispersant constitutes 10–40 weight percent of said oil phase.

4. A transparent lubricant composition according to claim 1 in which said water-soluble surfactant constitutes 15–40 weight percent of said aqueous phase.

5. A transparent lubricant composition as described in claim 1 and useful for lubrication of slow speed diesels comprising (a) 65 to 90 weight percent lubricating oil phase, (b) 10 to 35 weight percent aqueous phase, (c) an oil-soluble dispersant in a concentration equivalent to 10 to 30 weight percent of said oil phase, said oil-soluble dispersant being an alkylene oxide adduct of the general formula RO(R'O)$_n$H wherein R is selected from the group of aliphatic hydrocarbyl radicals containing at least 10 carbon atoms and alkaryl hydrocarbyl radicals containing an alkyl group of at least 5 carbon atoms, R' is a divalent C$_2$–C$_3$ aliphatic hydrocarbyl radical and $n$ has a value of 1 to 6, and (d) a water-soluble surfactant in a concentration of 15 to 40 weight percent of said aqueous phase, said water-soluble surfactant being an organic hydrotropic salt selected from the group consisting of alkali metal and ammonium salts of phenol, of aromatic carboxylic acids, of hydroxy- and carboxylic-substituted aryl compounds and of aliphatic monocarboxylic acids containing less than 8 carbon atoms.

6. A transparent lubricant composition as described in claim 1 and useful as a safety hydraulic fluid comprising (a) 30 to 60 weight percent lubricating oil phase, (b) 40 to 70 weight percent aqueous phase, (c) an oil-soluble dispersant in a concentration equivalent to 30 to 60 weight percent of said oil phase, said oil-soluble dispersant being an alkylene oxide adduct of the general formula $RO(R'O)_nH$ wherein R is selected from the group of aliphatic hydrocarbyl radicals containing at least 10 carbon atoms and alkaryl hydrocarbyl radicals containing an alkyl group of at least 5 carbon atoms, R' is a divalent $C_2$–$C_3$ aliphatic hydrocarbyl radical and $n$ has a value of 1 to 6 and (d) a water-soluble surfactant in a concentration of 15 to 40 weight percent of said aqueous phase, said water-soluble surfactant being an organic hydrotropic salt selected from the group consisting of alkali metal and ammonium salts of phenol, of aromatic carboxylic acids, of hydroxy- and carboxylic-substituted aryl compounds and of aliphatic monocarboxylic acids containing less than 8 carbon atoms.

References Cited in the file of this patent

UNITED STATES PATENTS

| | | |
|---|---|---|
| 2,402,373 | Cordero | June 18, 1946 |
| 2,692,859 | Talley et al. | Oct. 26, 1954 |
| 2,695,877 | Nichols et al. | Nov. 30, 1954 |
| 2,744,870 | Stillebroer et al. | May 8, 1956 |
| 2,832,736 | Jezl | Apr. 29, 1958 |
| 2,834,731 | Carpenter | May 13, 1958 |
| 2,877,186 | Krumei | Mar. 10, 1959 |
| 2,914,477 | Cafcas et al. | Nov. 24, 1959 |
| 2,944,022 | Ulzheimer et al. | July 5, 1960 |

FOREIGN PATENTS

| | | |
|---|---|---|
| 617,404 | Great Britain | Feb. 4, 1949 |
| 705,194 | Great Britain | Mar. 10, 1954 |

OTHER REFERENCES

"Atlas Surface Active Agents," pub. by Atlas Powder Co. Wilmington, Del., 1950, pages 28 and 29.

"Guide to the Use of Atlas Surfactants and Sorbitol in Pharmaceutical Products," Atlas Chemicals Division, Wilmington, Del., 1958, pages 20–22 relied on.

"Surface Active Agents and Detergents," Schwartz et al., vol. II, Interscience Publishers, New York, 1958 (pages 446–7 relied on).